C. P. BETTENGA.
ANIMAL FEEDING DEVICE.
APPLICATION FILED APR. 13, 1920.

1,365,367.

Patented Jan. 11, 1921.

Inventor,
C. P. Bettenga, by
G. C. Kennedy,
Attorney.

UNITED STATES PATENT OFFICE.

CRENO P. BETTENGA, OF WATERLOO, IOWA.

ANIMAL-FEEDING DEVICE.

1,365,367.   Specification of Letters Patent.   Patented Jan. 11, 1921.

Application filed April 13, 1920. Serial No. 373,670.

*To all whom it may concern:*

Be it known that I, CRENO P. BETTENGA, a citizen of the United States of America, and a resident of Waterloo, Blackhawk county, Iowa, have invented certain new and useful Improvements in Animal Feeding Devices, of which the following is a specification.

My invention relates to improvements in feeding devices, particularly for animals, such as hogs, and the object of my improvement is to provide means for proper drainage and aeration of the feeding vessel.

Figure 1:
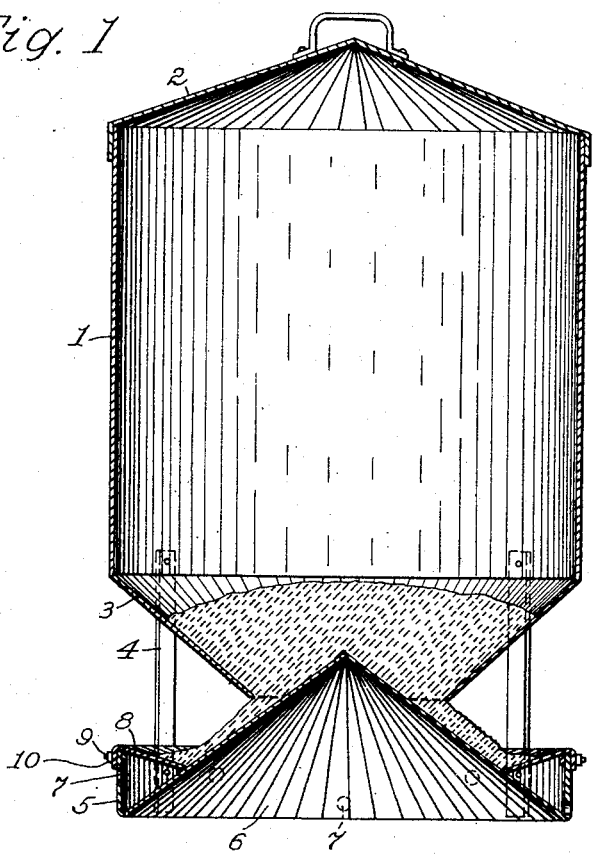
Figure 2:
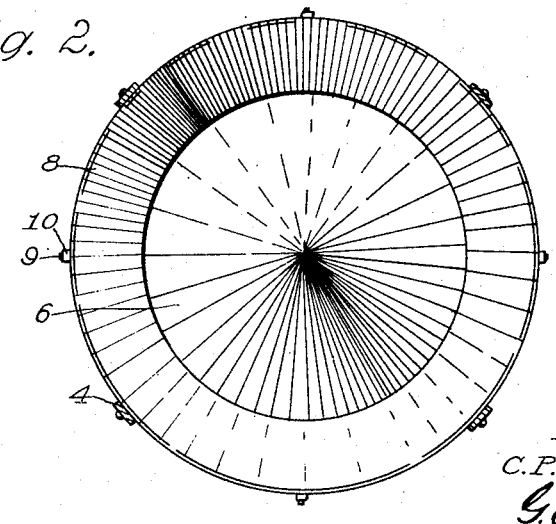

This object has been accomplished by the means which are hereinafter described and claimed, and which are illustrated in the accompanying drawings, in which Figure 1 is a vertical central section of my improved feeding device, and Fig. 2 is a top plan view of the feeding vessel only.

Similar numerals of reference denote corresponding parts throughout the several views.

5 is an open top feeding vessel of circular form but which may be of any other outline. This vessel has a conical concentric raised bottom 6 which is surrounded by a relatively high rimmed margin supplied with a plurality of openings 7 preferably positioned alternately around the rim at different heights. The numeral 8 denotes an annular downwardly coned frustal plate whose inner edge slopes downwardly toward and closely approaches the upper surface of the coned bottom 6, but is not sealed thereto, a narrow crevice at the joint permitting downward passage of liquid therethrough into the inclosed space under the plate, but not permitting passage of the coarsely granular materials such as are customarily used as feed for animals or poultry. The outer marginal part of the annular plate 8 is bent downwardly to surround the upper part of the rim 5 to which it is secured by means of bolts 9 and nuts 10. It is, of course, obvious that instead of supplying a separate removable plate 8, the rim 5 may be enlarged to permit of its being bent inwardly to form a like sloping member 8 for the same purpose. A number of standards 4 are positioned around and secured to the rim 5 and on their upper ends is secured a cylindrical hopper 1 whose downwardly coned bottom 3 has a large relatively central opening positioned concentrically about and suitably spaced from the upper part of the coned bottom 6 of said feeding vessel thereunder. The open upper end of the hopper 1 may be closed by means of the upwardly coned removable closure 2.

Grain, or granular feed in the hopper 1 is deposited by the conical bottom 3 upon the upper part of the cone 6 of said feeding vessel. Surplus moisture in the feed within the annular trough of said vessel, seeps through the crevice between the plate 8 and cone 6 into the annular cavity under said plate whence it issues through the lower opening 7. In case rain is driven into this trough, it is drained therefrom in the same way. The plurality of openings 7 at different heights in the rim 5, permits a free circulation of air in said annular space which soon dries it, and also draws some air through the feed in the annular trough, keeping the feed relatively dry.

The different elements specifically shown and described may be considerably varied in practice without departing from the principles of the invention.

Having described my invention, what I claim as new and desire to secure by Letters Patent, is:

1. In a device of the character described, an open top feeding vessel having a raised marginal rim, having its bottom raised to slope toward said rim, the rim being extended inwardly from the top slopingly toward and closely approaching said sloped bottom to allow liquids to drain therebetween while preventing passage therebetween of solid materials.

2. In a device of the character described, a circular feeding vessel having a raised marginal part, and having an upwardly coned bottom, said marginal part being directed from its top slopingly inwardly to closely approach said coned bottom, inclosing a space under said part, and said marginal part having a plurality of ports below its said inwardly-directed part.

3. In a device of the character described, an open top vessel having a conoidal bottom and a raised rim thereabout, the rim being first directed upwardly and then inwardly slopingly to closely approach the conoidal bottom, having a crevice therebetween sufficient to evacuate liquids but preventing passage of relatively coarse solid particles, the vessel having orifices under said sloping part for draining liquid from the space under the sloping part and for allowing circulation of air therethrough, and a hopper supported above said conoidal bottom to deliver its contents thereupon.

Signed at Waterloo, Ia., this 27th day of March, 1920.

CRENO P. BETTENGA.